United States Patent [19]
Lipshultz et al.

[11] Patent Number: 5,147,533
[45] Date of Patent: Sep. 15, 1992

[54] SINK WITH WATER PURIFICATION SYSTEM THEREUNDER

[75] Inventors: Alfred J. Lipshultz, 4090 Lake Dr., Coconut Creek, Fla. 33066; Mitchell Lipshultz, Ft. Lauderdale, Fla.

[73] Assignee: Alfred J. Lipshultz, Coconut Ck, Fla.

[21] Appl. No.: 786,596

[22] Filed: Nov. 1, 1991

[51] Int. Cl.⁵ .................................................. B01D 61/08
[52] U.S. Cl. ........................................ 210/98; 210/108; 210/138; 210/195.3; 210/257.2; 210/321.69
[58] Field of Search .............. 210/321.72, 97, 98, 210/100, 102, 108, 111, 138, 195.3, 257.2, 321.6, 321.69, 321.71, 393, 411, 416.3; 222/189, 40; 137/562, 216

[56] References Cited

U.S. PATENT DOCUMENTS 4,880,535  11/1989  Burrows .................... 210/321.72

*Primary Examiner*—Frank Sever
*Attorney, Agent, or Firm*—Charles E. Baxley

[57] ABSTRACT

A water purification system includes a storage tank, a prefilter, a reverse osmosis element, a deionization module, a feedwater connection, a brine discharge line, and an electronic memory panel, all of which are incorporated within mounted or mountable on the underside of a kitchen sink. The system also includes a long reach faucet and a product water connection connects the storage tank to the long reach faucet from which the storage tank discharges purified water.

1 Claim, 1 Drawing Sheet

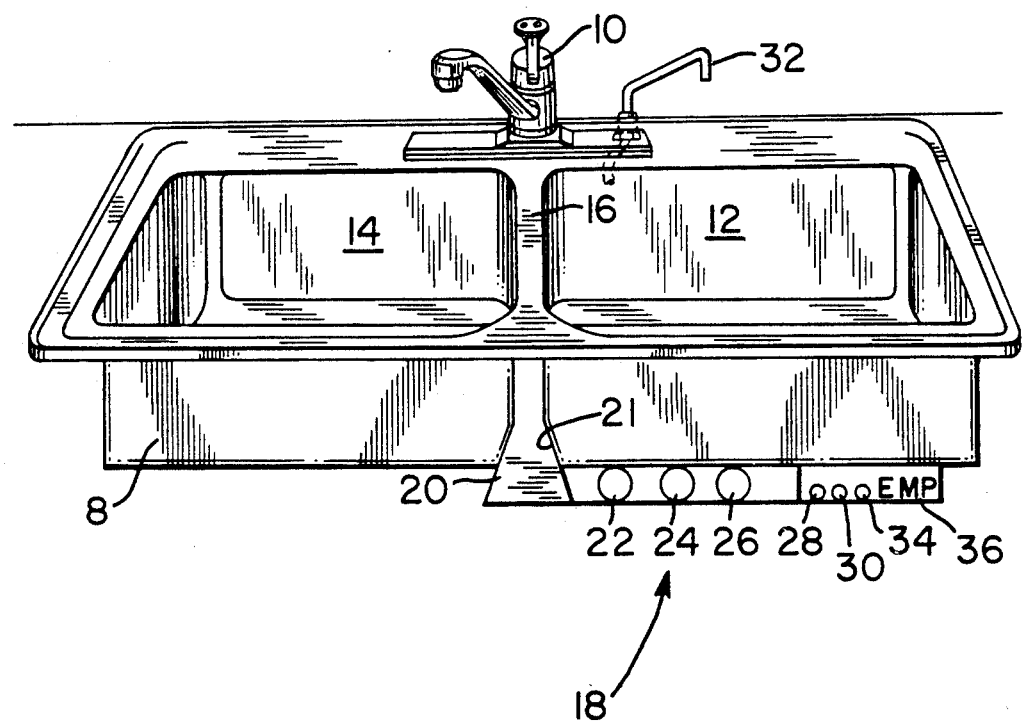

SINK WITH WATER PURIFICATION SYSTEM THEREUNDER

BACKGROUND OF THE INVENTION

This invention relates to a water purification system and more particularly to such a system that is incorporated into the underside of a kitchen sink, for renovation or new home construction.

Prior U.S. Pat. No. 4,759,844, granted Jul. 26, 1988, in the names of Mitchell Lipshultz and Alfred J. Lipshultz (the present inventors) discloses a water purification system that is small, portable, suitable for use in a house and does not use an external source of power. Furthermore, it is small enough to be placed on a countertop in a private home.

More particularly, the water purification system of the '844 patent operates under conventional water main pressure on a countertop and comprises an upper reservoir for purified water and a lower process compartment, a reverse osmosis unit, an ion exchange unit, and an activated carbon filter. The reverse osmosis unit, the ion exchange unit and the activated carbon filter are in the form of replaceable cartridges in the process compartment. Each of the reservoir, the reverse osmosis unit, the ion exchange unit and the activated carbon filter has an inlet and an outlet, and the system also comprises water communication means connected between the water supply and the inlet of the reverse osmosis unit, and between the outlet of the reverse osmosis unit and the inlet of the ion exchange unit, and between the outlet of the ion exchange unit and the inlet of the activated carbon filter, and between the outlet of the activated carbon filter and the inlet of the reservoir. The reservoir has a tap and an overflow port and the reverse osmosis unit has an additional outlet for disposal of waste brine.

The water purification system of the '844 patent successfully achieves the above mentioned objects thereof, but, as stated, that prior system is placeable on a countertop in a private home.

The present invention gets the system of the '844 patent off of the countertop and under a sink, thus freeing the countertop for other uses and removing clutter therefrom. The system is positioned in a space that otherwise would not be used, whereas according to the prior art valuable counter space or under-counter floor storage space had to be occupied.

The manner in which the invention attains the aforesaid objects and advantages, among others will appear hereinafter.

SUMMARY OF THE INVENTION

A water purification system according to the present invention includes a storage tank, a prefilter, a reverse osmosis element, a deionization module, a feedwater connection, a brine discharge line, and an electronic memory panel, all of which are incorporated within on the underside of a kitchen sink. The system also includes a long reach faucet and a product water connection connects the storage tank to the long reach faucet through which the storage tank discharges purified water.

DESCRIPTION OF THE DRAWING

The single figure is a perspective, somewhat schematic view of a preferred water purification system according to the invention.

DESCRIPTION OF THE INVENTION

The drawing shows a kitchen sink 8 having a hollow ball single lever faucet 10 having a right well 12 and a left well 14 of the same size and symmetrically disposed on opposite sides of a central ridge 16. Sink 8 has a water purification system indicated generally at 18, most elements of which are mounted under sink 8. System 18 has a molded-in plastic air/water storage tank 20 located in the usual gap 21 between wells 12 and 14 on the underside of sink 8. Gap 21 is selected as the location of tank 20 because tank 20 is conveniently supported in gap 21 and occupies space that is usually inaccessible from the front due to the usual cabinet post (not shown).

System 18 also comprises a prefilter 22, a reverse osmosis element 24 and an ion exchange unit or deionization module 26, all of which are included in the system disclosed in said U.S. Pat. No. 4,759,844.

Further elements of system 18 are a feedwater connection 28, a brine discharge line 30 that connects to a discharge barb (not shown) in a long reach faucet 32 with a gap as shown in U.S. Pat. No. 4,856,559 of Aug. 15, 1989.

A product water connection 34 connects storage tank 20 to the long reach faucet 32 from which storage tank 20 discharges purified water.

Lastly, system 18 includes an electronic memory panel 36 (marked "EMP") as shown in U.S. Pat. No. 4,925,551 of May 15, 1990. Panel 36 operates system 18 automatically, including the functions of flushing potentially plaquing debris on reverse osmosis element 24 and automatically turning system 18 on and off to minimize or eliminate water waste.

It is apparent from the foregoing that the invention well attains the stated objects and advantages, among others.

The disclosed details are exemplary only and are not to be taken as limitations on the invention except as those details may be included in the appended claims.

What is claimed is:

1. A combination comprising a water purification system and a kitchen sink having a right well and a left well symmetrically disposed on opposite sides of a central ridge providing a gap therebeneath on the underside of said sink, said water purification system comprising a plastic air/water storage tank molded in place in said gap on the underside of said sink, wherein said water purification system further comprises a prefilter, a reverse osmosis element, a deionization module, a feedwater connection, a brine discharge line and an electronic memory panel, all of which are incorporated within the underside of said sink, and wherein said water purification system further comprises a long reach faucet and a product water connection that connects said tank to said long reach faucet from which purified water is discharged from said tank.

* * * * *